United States Patent [19]

Hausen et al.

[11] 4,194,903

[45] Mar. 25, 1980

[54] METHOD OF PRODUCING STEEL WITH THE LOWEST POSSIBLE SULFUR CONTENT BY DESULFURIZATION OF PIG IRON WITH MAGNESIUM COKE

[75] Inventors: Peter Hausen; Klaus-Dieter Schülz, both of Dortmund, Fed. Rep. of Germany

[73] Assignee: Hoesch Werke Aktiengesellschaft, Dortmund, Fed. Rep. of Germany

[21] Appl. No.: 959,061

[22] Filed: Nov. 9, 1978

Related U.S. Application Data

[63] Continuation of Ser. No. 841,460, Oct. 12, 1977, abandoned.

[51] Int. Cl.² ............................................. C21C 7/02
[52] U.S. Cl. ............................................. 75/58; 75/53; 75/130 R
[58] Field of Search ............................ 75/130 R, 58, 53

[56] References Cited

U.S. PATENT DOCUMENTS

| 3,598,575 | 8/1971 | Jarysta | 75/130 R |
|---|---|---|---|
| 3,656,989 | 4/1972 | Layland | 75/58 |
| 3,827,680 | 8/1974 | Wheeler | 75/130 R |
| 3,885,957 | 5/1975 | Richter | 75/53 |
| 3,929,464 | 12/1975 | Todd | 75/58 |
| 3,957,502 | 5/1976 | Cull | 75/130 R |
| 3,998,625 | 12/1976 | Koros | 75/58 |

*Primary Examiner*—P. D. Rosenberg
*Attorney, Agent, or Firm*—Becker & Becker Inc.

[57] ABSTRACT

A method of producing steel with the lowest possible desired sulfur content by desulfurization of pig iron with magnesium coke. The magnesium coke is introduced into the pig iron smelt which is to be desulfurized. An inert gas such as nitrogen is then introduced into the smelt to agitate same until the magnesium is completely reacted. The thus treated smelt is subjected to subsequent inert gas rinsing in order to separate magnesium sulfide from the smelt and convey to into the slag formed on the smelt. A slag-free area is then produced on the surface of the smelt by introducing inert rinsing gas on the surface. Slag powder is introduced upon the exposed surface of the smelt to form a cohesive, viscous slag, which is then withdrawn. Scrap iron having suitable high or low sulfur content may be introduced into the desulfurized pig iron to adjust the desired sulfur content thereof.

4 Claims, No Drawings

METHOD OF PRODUCING STEEL WITH THE LOWEST POSSIBLE SULFUR CONTENT BY DESULFURIZATION OF PIG IRON WITH MAGNESIUM COKE

This is a continuation of application Ser. No. 841,460-Hausen, et al filed Oct 12, 1977, now abandoned.

The present invention relates to a method of producing steel with the lowest possible sulfur content by improving the heretofore known dipping or immersing process for desulfurization of crude or pig iron with magnesium coke.

The use of the pig iron-desulfurization technique by immersion of magnesium coke has remained limited due to numerous problems and shortcomings. The main reason for this is the incomplete utilization of the magnesium which is put in. It was discovered that a more or less great amount of the magnesium coke in the treatment container does not take part in the desulfurization reaction and, after the immersion process, burns off on the surface of the treated smelt. One explanation therefor is the fact that the magnesium embedded in the coke reacts very quickly and vigorously on the surface of the coke and thereafter, as a result of not dissolving the coke, the magnesium only burns off slowly. Consequently, the amount of magnesium coke put in is too high in relation to the degree of desulfurization, and the final sulfur content cannot be adjusted to a specific final value. In addition to the previously mentioned drawback of the immersion desulfurization, the highly fluid magnesium sulfide slag, which has a high sulfur content, cannot be completely removed by conventional slag removal techniques, so that a portion of the sulfur from the slag passes into the refining container and thus again into the smelt. Moreover, the magnesium sulfide particles, which are finely dispersed in the metallic smelt and are not separated, contribute to the reverse desulfurization in the refining container. As a result, the desired manufacture of steels with the lowest possible sulfur content by the use of magnesium coke to desulfurize pig iron has not been economically possible to date.

It is, therefore, an object of the present invention, by combining individual processes which, in themselves, are known in the smelting industry, to develop a new method by means of which the drawbacks of the heretofore known desulfurization technique with magnesium coke are avoided, an economical and fine desulfurization is possible, and the adjustment of the desired final sulfur content in the refining container is made easier.

With this object in mind, the method according to the present invention is characterized by a combination of method steps. The first step takes place after immersing the magnesium coke in the pig iron smelt and after dying away of the initially vigorous magnesium vaporization by producing a forced rotation of the smelt in the treatment container by means of a cleansing or rinsing gas. According to the first step, pig iron constantly flows around and through the immersion bell with which the magnesium coke is introduced into the treatment container. As a result, on the one hand new pig iron with a relatively high sulfur content is constantly brought to the at present relatively inert magnesium coke, and on the other hand the material exchange surface is increased.

For this purpose, in the body of the container which holds the smelt, about 80 cm above the bottom of the container, preferably two rinsing stones (Spulsteine) are installed and are connected to a rinsing gas line by means of a conduit installed on the periphery of the container. The correct choice of the position of the rinsing gas inlet and the intensity of the rinsing gas introduced is crucial to the success of the desulfurization. With earlier attempts, damages resulted to the immersion bell dur to overly intensive circulation and rinsing in the region of the bell. As a result, the desulfurization was considerably impaired.

The introduction of the rinsing gas can alternatively be effected by rinsing stones inserted in the bottom of the container and by immersion lances introduced into the smelt from above, and if necessary also by a supply line which acts upon the immersion bell.

As soon as, several minutes after immersion of the immersion bell in the smelt, the vigorous bath movement, which is caused by the reaction effected by the magnesium available at the surface, dies away, the rinsing gas, preferably nitrogen, is introduced into the treatment container. The rinsing or cleansing continues until all the magnesium has reacted, i.e., approximately ten minutes after immersion.

The second step of the method according to the present invention comprises the homogenization of the metallic smelt after the immersion bell is removed from the smelt. For this purpose, for ten more minutes, rinsing gas is introduced into the container, as a result of which the very small magnesium sulfide particles, which are suspended in the smelt, are separated better and are conveyed into the slag. The rinsing gas treatments according to the first and second method steps are linked with one another and practically merge.

In the third step of the method pursuant to the present invention, the slag is removed from the ladle by means of a new slag removal technique. This new slagging or slag removal technique comprises the following steps: first, a slag-free zone, which proceeds from the raised side of the container, is produced on the surface of the bath with the aid of rinsing gas, which becomes operative on the surface of the bath in the wall region of the raised side of the container. The slag, which has already been partially shifted to the opposite side, is withdrawn with the aid of a skimmer or rabble which seizes the slag from behind. After forming the slag-free zone, at the temperature of the pig iron, a synthetic slag powder, which forms a cohesive, viscous slag, is deposited upon the exposed surface of the bath. By the use of this new slag removal technique, the thin, largely sulfur containing slag is nearly completely removed from the smelt, so that a reverse desulfurization by introduction of the largely sulfur containing slag residue no longer occurs. At the same time, a clean separation of slag and iron is achieved, so that the iron loss during slag removal is considerably less than the loss which occurs with the conventional technique. With this step also, the rinsing gas treatment merges with the preceding method steps. In other words, the pig iron smelt is continuously rinsed or cleansed during the three method steps.

By means of the combination of these method steps, the above described drawbacks of immersion desulfurization with magnesium coke are avoided and, in addition, several advantages are achieved which were not possible with the heretofore known immersion desulfurization technique. These advantages are illustrated in the following paragraphs:

The desulfurization medium is optimally utilized by means of the stirring or agitation of the metallic smelt, as a result of which a smaller amount of desulfurization medium can be used and the operation costs are lowered. By means of the complete utilization of the desulfurization medium, the good sulfide separation, and the nearly complete slag separation, the desulfurization of the pig iron down to values of about 0.002% sulfur with relatively little consumption of magnesium coke is possible.

A fine desulfurization, in contrast to conventional desulfurization, can be carried out successfully pursuant to the present invention with magnesium coke even at pig iron temperatures below 1250° C.

The desulfurization slag is nearly completely removed from the treatment ladle, so that a reverse desulfurization by the ladle slag during subsequent treatment is avoided.

The desired production of steels with about 0.004% sulfur is possible with the introduction of low sulfur scrap iron in the converter. Furthermore, higher sulfur contents can also be adjusted in the converter.

The slag removal times are shorter and the pig iron losses are less than is the case with other methods.

The following table compares the desulfurization of conventional processes with the process pursuant to the present invention.

Table I

| Process | % S in PI Prior to treatment | % S in PI after treatment | % S in PI with 30% low sulfar scrap iron introduced in converter |
|---|---|---|---|
| 1. Steel production without desulfurization of pig iron (PI) | 0.023 | 0.023 | 0.020 |
| 2. Steel production with prior desulfurization of pig iron by immersion with use of magnesium coke (1 kg magnesium coke/ton of PI) | 0.023 | 0.007 | 0.012 |
| 3. Steel production with an additional rinsing gas treatment for increased desulfurization medium utilization and homogenization of the treatment smelt (1 kg magnesium coke/ton of PI) | 0.023 | ≦0.003 | ≦0.007 |
| 4. Steel production with an additional rinsing gas treatment for increased desulfurization medium utilization and homogenization of the treatment smelt and subsequent slag removal according to the new slag removal technique (1 kg magnesium coke/ton PI) | 0.023 | ≦0.003 | ≦0.0045 |

The following examples describe the steel production at desired sulfur contents with the use of the desulfurization process pursuant to the present invention:

EXAMPLE I

Steel having a maximum 0.005% S was to be produced in the converter. For this purpose, 145 tons of pig iron with the following analysis were available: 4.65% C, 0.75% Si, 0.60% Mn, 0.15% P, and 0.023% S. The temperature of the pig iron was 1225° C.

Since the pig iron was to be desulfurized to a desired sulfur content of less than 0.005%, the immersion bell was filled with 150 kg magnesium coke and was transported to the desulfurization stand.

The gas supply line for the rotation was connected to the treatment ladle, and the immersion beel was quickly lowered into the ladle. In the end position, the immersion bell was spaced from the bottom of the ladle by about 50 cm. After about four minutes, the bath movement in the treatment ladle had been calmed by the magnesium reaction. Nitrogen was then introduced through two ladle rinsing stones. The gas pressure, according to the condition of the rinsing stones, was 3 to 10 bar; the volume of the gas stream was about 450 Nl/min. Ten minutes after its immersion, the immersion bell was slowly pulled out of the smelt and the smelt was further rinsed with nitrogen. After about ten minutes while maintaining the nitrogen rinse, the treatment ladle was transported to the slag removal stand. Here the slag was completely removed, during which process the ladle was further rinsed with nitrogen. After six minutes, the slag was removed from the ladle. The slag removal losses amounted to about 600 kg pig iron. The pig iron temperature after the slag removal was 1250° C. The analytical values of the subsequent sample read: 4.6% C, 0.74% Si, 0.61% Mn, 0.15% P, and 0.002% S.

This pig iron was subsequently blasted or blown to steel in the converter with 40 tons of low sulfur scrap iron. The sulfur content of the finished steel amounted to 0.004% and fell thereby within the desired analysis.

EXAMPLE II

Steel having approximately 0.025% S was to be produced. The sulfur content of the available pig iron was 0.055% and the temperature was 1340° C. The pig iron, pursuant to the method of the present invention, was desulfurized with the 150 kg magnesium coke to 0.010% and was blasted to steel in the converter with 50 tons of high sulfur scrap iron. The sulfur content of the finished steel amounted to 0.023% S and fell within the desired analysis.

EXAMPLE III

Steel having a maximum of 0.015% S was to be produced. 150 tons pig iron with a sulfur content of 0.03% and a temperature of 1405° C. were available. The pig iron, pursuant to the method of the present invention, was desulfurized with 80 kg magnesium coke to 0.01% sulfur and was blasted to steel in the converter with 40 tons of low sulfur scrap iron. The sulfur content of the finished steel amounted to 0.015% and fell thereby within the desired analysis.

The advantages of the method pursuant to the present invention for producing steel having desired sulfur contents are easily recognized from the above examples. With the adjustment of the sulfur content in the pig iron, in combination with selective introduction of scrap iron into the refining container, desired sulfur contents can be adjusted in the finished steel.

It is, of course, to be understood that the present invention is by no means limited to the specific disclosure of the examples, but also encompasses any modifications within the scope of the appended claims.

What we claim is:

1. A process for production of steel with low sulfur content by desulfurization of a melt of pig iron, said method comprising in combination the steps of: introducing magnesium coke by an immersing bell into a melt of pig iron; after initial reaction of magnesium with melt, introducing inert rinsing gas to stir the melt until all magnesium has reacted; removing magnesium bell; continuing to introduce inert rinsing gas to separate magnesium sulfide particles from melt to collect in slag maintained on surface; tilting the melt to move slag to low side and introducing inert rinsing gas to form slag-free zone on the high side; and withdrawing slag containing magnesium sulfide by engagement behind slag on high side to scrape slag from melt.

2. A process for the production of steel according to claim 1 which includes in combination the step of adjusting the desired sulfur content of the pig iron by the introduction of scrap iron into the desulfurized pig iron, said scrap iron having a sulfur content suitable for yielding the desired final sulfur content of the pig iron when mixed with the desulfurized pig iron.

3. A process for the production of steel in combination according to claim 1, in which said inert rinsing gas is nitrogen.

4. A process in combination as claimed in claim 1, including the further step of depositing a synthetic slag powder on the exposed surface of the melt and removing the slag.

* * * * *

UNITED STATES PATENT AND TRADEMARK OFFICE
CERTIFICATE OF CORRECTION

PATENT NO. : 4194903
DATED : 25 March 1980
INVENTOR(S) : Peter Hausen et al

It is certified that error appears in the above-identified patent and that said Letters Patent are hereby corrected as shown below:

[30]      Foreign Application Priority Data
   Oct. 12, 1976 [DE]  Federal Republic of Germany  2645944

Signed and Sealed this

Twenty-fourth Day of June 1980

[SEAL]

*Attest:*

SIDNEY A. DIAMOND

*Attesting Officer*   *Commissioner of Patents and Trademarks*